US010685347B1

(12) United States Patent
Edwards et al.

(10) Patent No.: US 10,685,347 B1
(45) Date of Patent: Jun. 16, 2020

(54) ACTIVATING A TRANSACTION CARD

(71) Applicant: Capital One Services, LLC, McLean, VA (US)

(72) Inventors: Joshua Edwards, McLean, VA (US); Francisco Perezleon, McLean, VA (US); Jason Ji, McLean, VA (US); Angelina Wu, McLean, VA (US); Kaitlin Newman, McLean, VA (US); Molly Johnson, McLean, VA (US); Colin Hart, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/284,438

(22) Filed: Feb. 25, 2019

(51) Int. Cl.
G06Q 20/20 (2012.01)
G06Q 20/34 (2012.01)
G06K 9/00 (2006.01)
G06F 21/35 (2013.01)
G06F 21/32 (2013.01)
G06F 21/36 (2013.01)

(52) U.S. Cl.
CPC ........... *G06Q 20/354* (2013.01); *G06F 21/32* (2013.01); *G06F 21/35* (2013.01); *G06F 21/36* (2013.01); *G06K 9/00483* (2013.01)

(58) Field of Classification Search
None
See application file for complete search history.

(56) References Cited

U.S. PATENT DOCUMENTS

| 8,831,329 B1* | 9/2014 | Kumar | G06K 9/18 382/139 |
|---|---|---|---|
| 2008/0218591 A1* | 9/2008 | Heier | G06Q 20/20 348/150 |
| 2012/0296818 A1* | 11/2012 | Nuzzi | G06Q 20/3224 705/41 |
| 2013/0260856 A1* | 10/2013 | Irwin, Jr. | G07F 17/329 463/17 |
| 2014/0052636 A1 | 2/2014 | Mattes | |
| 2014/0330660 A1* | 11/2014 | Glass | G06Q 20/354 705/21 |
| 2016/0071101 A1* | 3/2016 | Winarski | G06Q 20/3829 705/71 |

(Continued)

OTHER PUBLICATIONS

Emily McNutt, "You Can Now Activate Your Citi Card by Taking a Picture of It", https://thepointsguy.com/2017/01/citi-card-photo-activation/, Jan. 27, 2017, 10 pages.

(Continued)

*Primary Examiner* — William J Jacob
(74) *Attorney, Agent, or Firm* — Harrity & Harrity, LLP

(57) ABSTRACT

A device may receive, from a user device, a request to activate a transaction card. The device may verify an image as a non-fraudulent image based on the metadata associated with the image and a verified identity of the user device or a user of the user device based on the data associated with the user device. The device may process the image using an image processing technique to extract information from the image. The device may identify the transaction card to be activated by performing a lookup of the extracted information in a data structure. The device may perform one or more actions related to completing an activation of the transaction card.

20 Claims, 9 Drawing Sheets

(56) References Cited

U.S. PATENT DOCUMENTS

2017/0124535 A1* 5/2017 Juels ................... G06Q 20/065

OTHER PUBLICATIONS

William Charles, "Citi Allows Card Activation Through Taking a Photo via Mobile App", https://www.doctorofcredit.com/citi-allows-card-activation-taking-photo-via-mobile-app/, Feb. 15, 2017, 4 pages.
Max, "How do I activate my MoviePass card?" https://support.moviepass.com/hc/en-us/articles/115002347132-How-do-I-activate-my-MoviePass-card-, Feb. 16, 2019, 3 pages.

* cited by examiner

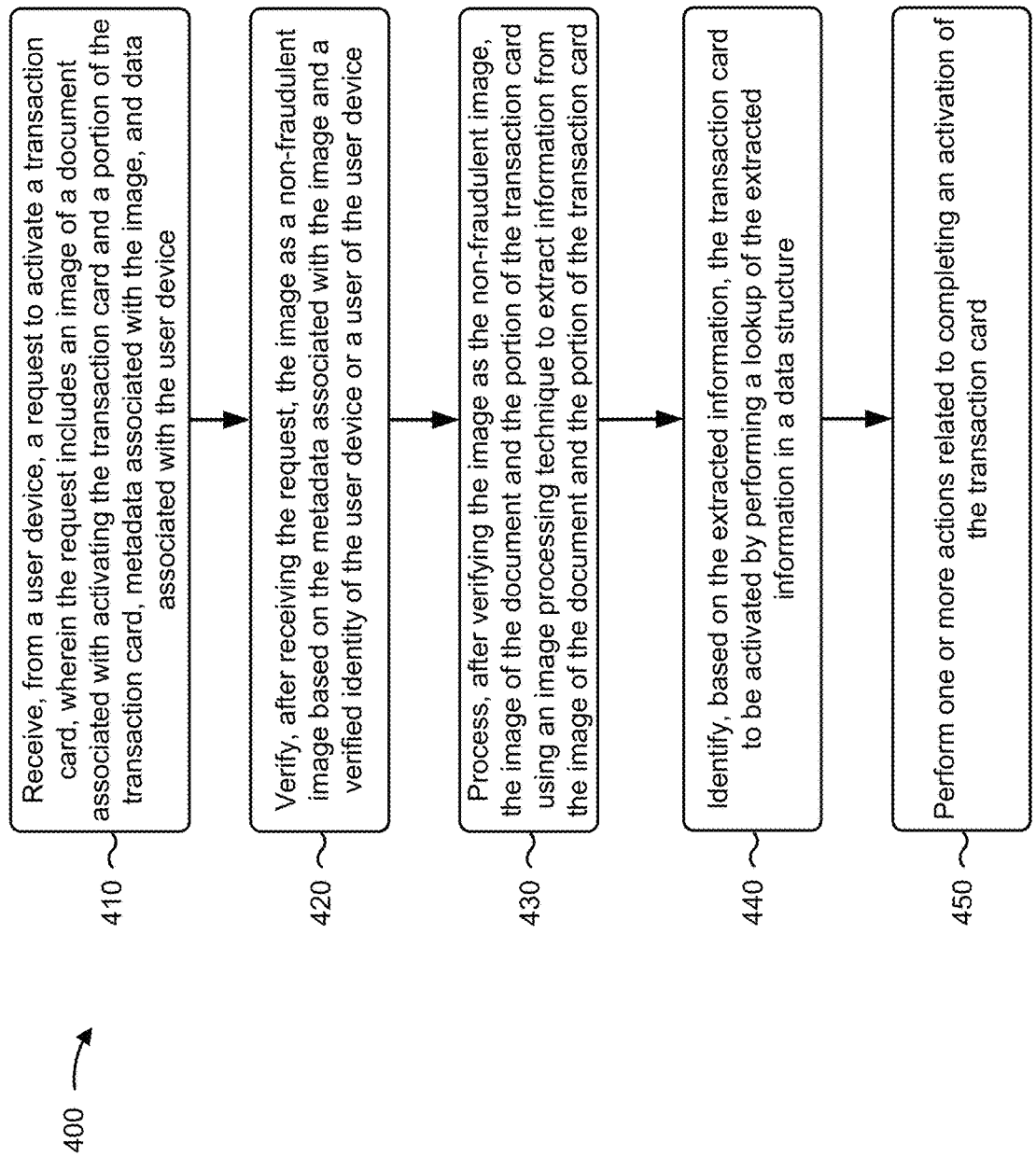

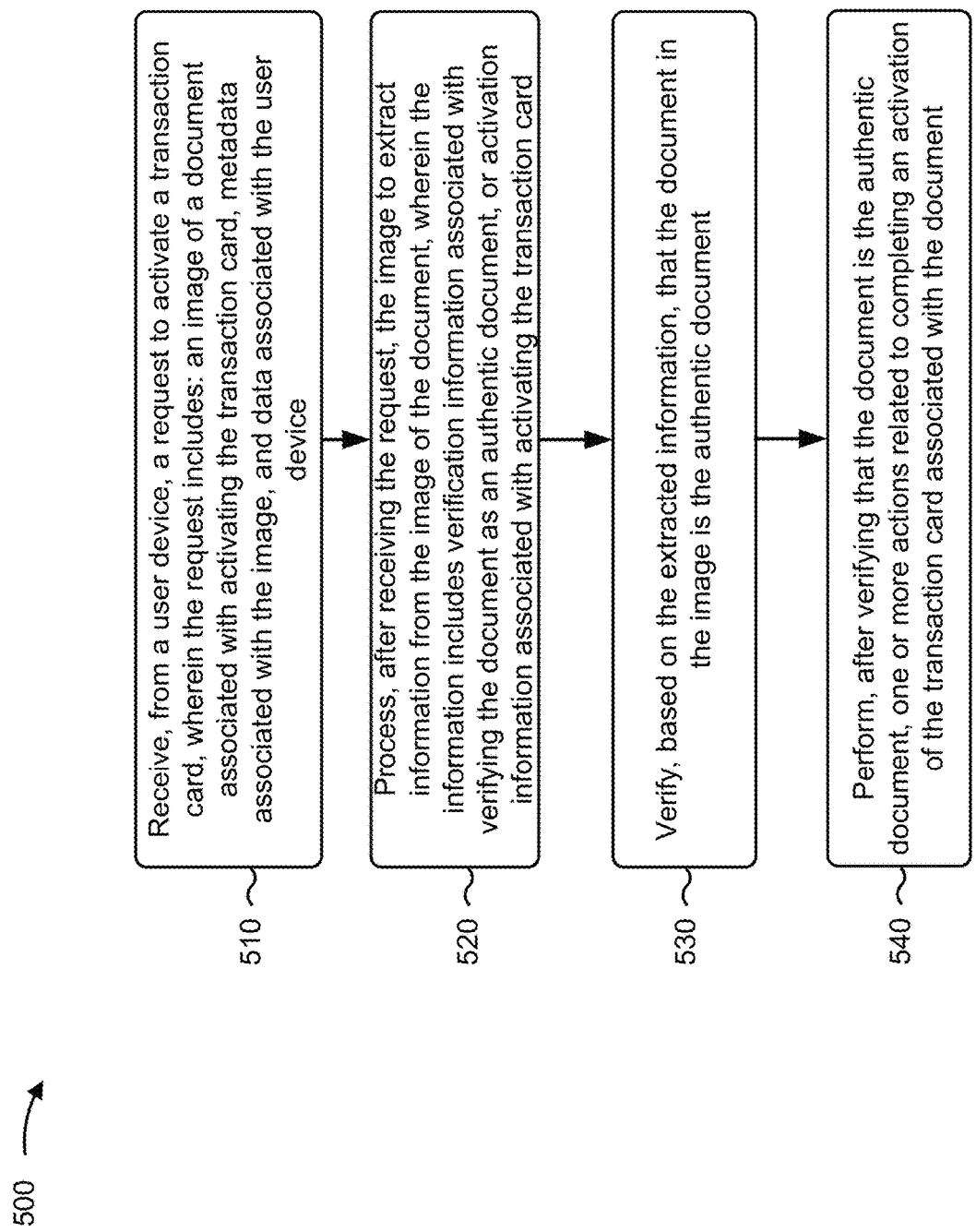

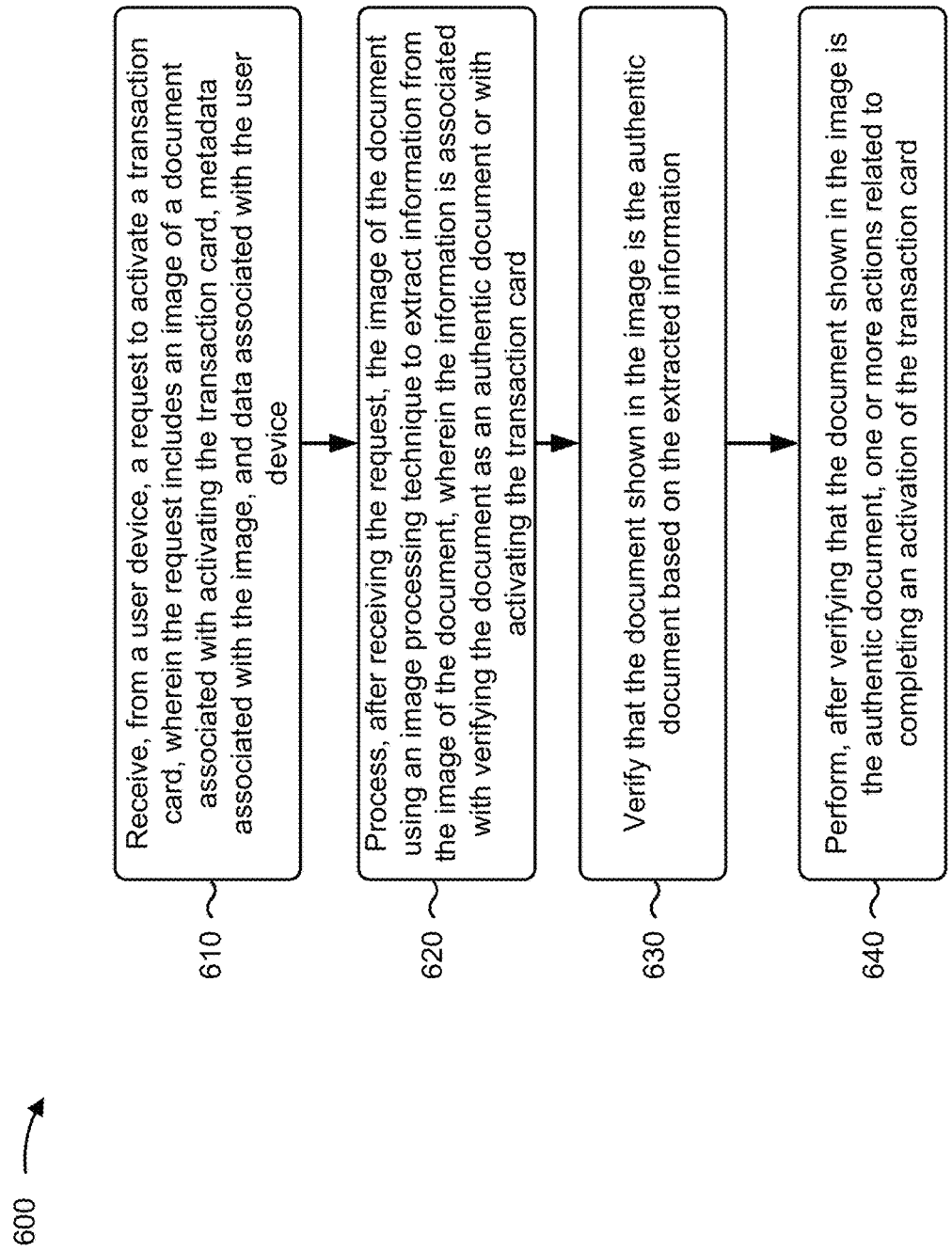

US 10,685,347 B1

ACTIVATING A TRANSACTION CARD

BACKGROUND

A transaction card includes a credit card, a debit card, a charge card, an automated teller machine (ATM) card, a stored-value card, a fleet card, an access card, a fare card, and/or the like. For example, a transaction card can be used to withdraw cash from an ATM, to complete a purchase, to pay fare for transportation, to access an area (e.g., a building or a fenced-in area), and/or the like depending on the type of the transaction card. Transaction cards often need to be activated prior to using the transaction card.

SUMMARY

According to some implementations, a method may include receiving, by an activation platform and from a user device, a request to activate a transaction card, wherein the request includes: an image of a document associated with activating the transaction card, metadata associated with the image, and data associated with the user device; verifying, by the activation platform and after receiving the request, the image as a non-fraudulent image based on the metadata associated with the image and a verified identity of the user device or a user of the user device based on the data associated with the user device; processing, by the activation platform and after verifying the image as the non-fraudulent image, the image of the document using an image processing technique to extract information from the image of the document; identifying, by the activation platform and based on the extracted information, the transaction card to be activated by performing a lookup of the extracted information in a data structure; and performing, by the activation platform, one or more actions related to completing an activation of the transaction card.

According to some implementations, a device may include one or more memories; and one or more processors, communicatively coupled to the one or more memories, configured to: receive, from a user device, a request to activate a transaction card, wherein the request includes: an image of a document associated with activating the transaction card, metadata associated with the image, and data associated with the user device; process, after receiving the request, the image to extract information from the image of the document, wherein the information includes: verification information associated with verifying the document as an authentic document, or activation information associated with activating the transaction card; verify, based on the extracted information, that the document in the image is the authentic document; and perform, after verifying that the document is the authentic document, one or more actions related to completing an activation of the transaction card associated with the document.

According to some implementations, a non-transitory computer-readable medium may store one or more instructions. The one or more instructions, when executed by one or more processors of a device, may cause the one or more processors to: receive, from a user device, a request to activate a transaction card, wherein the request includes: an image of a document associated with activating the transaction card, metadata associated with the image, and data associated with the user device; process, after receiving the request, the image of the document using an image processing technique to extract information from the image of the document, wherein the information is associated with verifying the document as an authentic document or with activating the transaction card; verify that the document shown in the image is the authentic document based on the extracted information; and perform, after verifying that the document shown in the image is the authentic document, one or more actions related to completing an activation of the transaction card.

BRIEF DESCRIPTION OF THE DRAWINGS

FIGS. 4-6 are flow charts of one or more example processes for activating a transaction card.

DETAILED DESCRIPTION

Figure 1A:
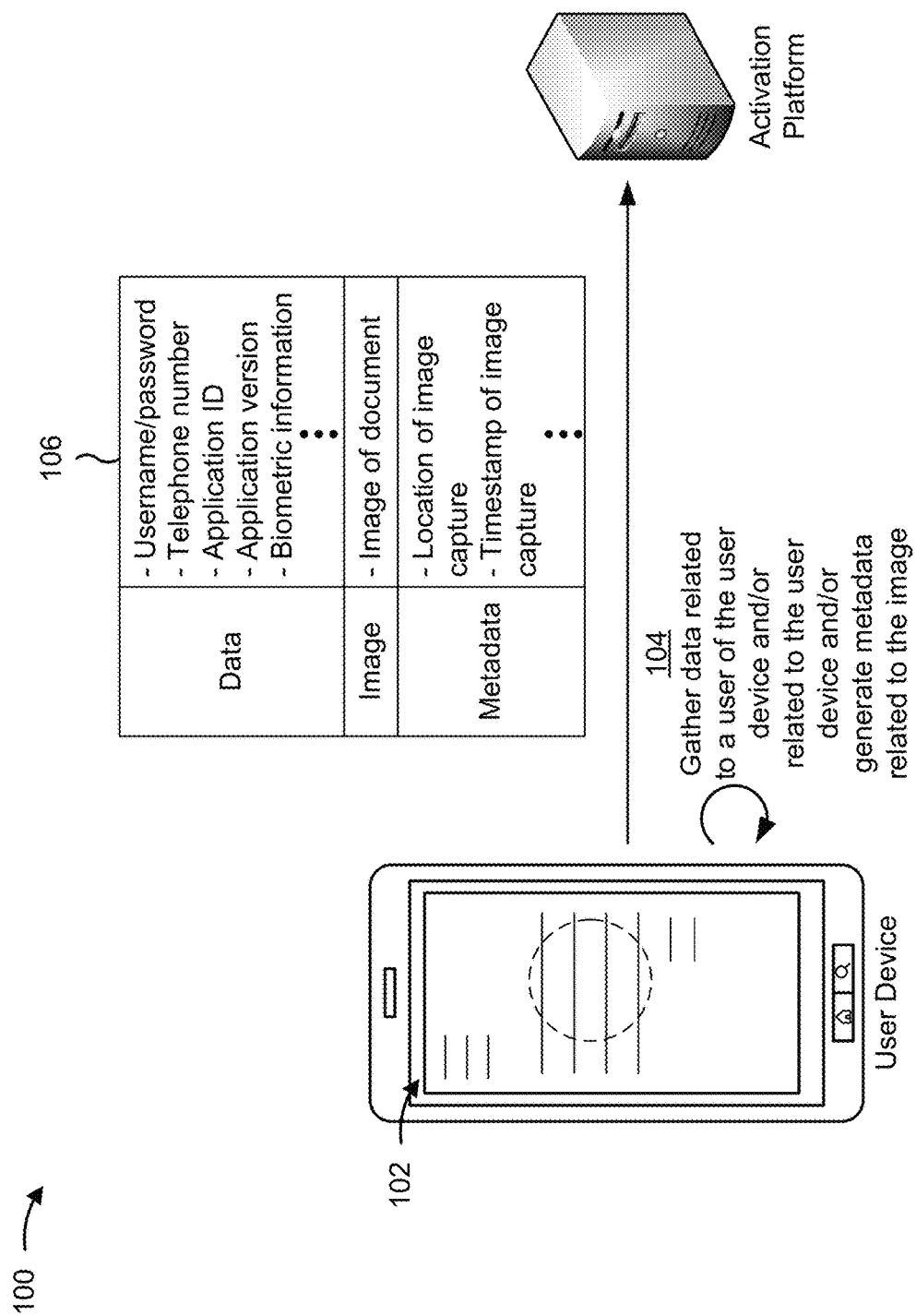
FIGS. 1A-1D are diagrams of one or more example implementations described herein.

The following detailed description of example implementations refers to the accompanying drawings. The same reference numbers in different drawings may identify the same or similar elements.

Transaction cards often require activation prior to the first use of the transaction card. For example, a cardholder of the transaction card may have to call a telephone number, may have to visit a physical branch of an organization, may have to visit a website, may have to load the transaction card with money, and/or the like prior to using the transaction card, depending on a type of the transaction card. Often, the activation process involves sending the cardholder the transaction card and a pin (or other activation information) in separate envelopes at slightly different times (e.g., separated by a few days). The cardholder would then provide transaction card information (e.g., a card number, a security code, an account number of an account associated with the transaction card, and/or the like) and activation information (e.g., the pin included in one of the envelopes) to the organization to activate the transaction card. This activation method consumes significant resources (e.g., computing resources of a device used to contact an organization). In addition, while this activation method provides some security with regard to preventing a malicious actor from activating the transaction card, this activation method may not prevent a malicious actor from activating the transaction card if the malicious actor obtains access to both of the envelopes (e.g., via opening the envelopes, via obtaining transaction card information and/or activation information by holding the envelopes to a light source, by having envelopes sent to the malicious actor's address instead of the address of person to whom the transaction card is associated, and/or the like).

Malicious activation of transaction cards consumes significant resources of various entities. For example, the cardholder may need to use a user device to contact an organization, such as by calling the organization or by sending an email to the organization (which consumes computing resources of the user device of the cardholder and/or a device (e.g., a user device and/or a server device) of the organization), by driving to a physical branch location of the organization (which consumes fuel resources of a vehicle of the cardholder, wastes time of the cardholder and/or an employee of the organization, and/or the like), and/or the like. Additionally, or alternatively, the organization may need to issue a new transaction card to the cardholder (which consumes material used to make the transaction card, paper resources used to send new envelopes to the cardholder, and/or the like), may need to investigate the fraudulent activation of the transaction card (which consumes time of employees of the organization, computing resources of devices used to investigate the fraudulent activation, and/or the like), and/or the like.

Some implementations described herein provide an activation platform that is capable of activating a transaction card based on determining a match between an identifier of a user device used to activate the transaction card (or of a user of the user device) and an intended recipient of the transaction card and/or a document (e.g., an activation letter, a personal identification number (PIN) mailer envelope, and/or the like) associated with activating the transaction card using a set of indicators included in the document. For example, an individual attempting to activate the transaction card may send, to the activation platform and from a user device, an image of the document and/or the transaction card, and the activation platform may process data associated with the image and/or the user device to confirm an identity of the user device, may process the image to verify the document based on the set of indicators included in the document, and/or the like prior to activating the transaction card. In this way, the activation platform provides a tool that can be used to more accurately verify an identity of the individual attempting to activate the transaction card and/or a document used to activate the transaction card, relative to prior activation methods.

Activating a transaction card in this manner improves a security of activating a transaction card relative to other activation methods (e.g., via use of multiple factors to confirm an identity of an individual and/or a user device associated with an attempt to activate the transaction card). In addition, activating a transaction card in this manner conserves computing resources that would otherwise be wasted using another activation method by improving an efficiency of activating a transaction card and/or due to a fraudulent activation of a transaction card by reducing or eliminating a risk of a fraudulent activation. Further, activating a transaction card in this manner conserves computing resources that would otherwise be consumed investigating a fraudulent activation of a transaction card. Further, activating a transaction card in this manner conserves other resources (e.g., fuel resources, transaction card material resources, paper resources, and/or the like) that would otherwise be consumed as a result of a fraudulent activation.

FIGS. 1A-1D are diagrams of one or more example implementations 100 described herein. Implementations 100 include a user device, an activation platform, and a server device (shown in FIG. 1D).

As shown in FIG. 1A, and by reference number 102, an individual may use a user device to capture an image of a document associated with activating a transaction card. For example, the document may be a letter, a PIN mailer envelope, and/or the like. In some implementations, the document may include various indicators as verification information associated with verifying the document as an authentic document, as activation information associated with activating the transaction card, and/or the like. For example, the verification information may include a machine-readable label (e.g., a barcode, a quick response (QR) code, and/or the like), a set of characters (e.g., a set of numbers, letters, symbols and/or the like that form an identifier, that form the text of the document, and/or the like), a graphical object (e.g., a logo, a security image, a graphical and/or stylistic pattern in the background and/or margins of the document, and/or the like), and/or the like.

In some implementations, the user of the user device may capture an image of the transaction card to be activated. For example, the user may capture the image of the transaction card at the same time as capturing the image of the document, such as by including the transaction card in a field of view of a camera of the user device, may capture a separate image of the transaction card, and/or the like. In some implementations, the image may show portions of the transaction card that include a card number of the transaction card, a security code (e.g., a card verification value (CVV)), an identifier of the cardholder of the transaction card, and/or the like.

As shown by reference number 104, the user device may gather data related to a user of the user device and/or related to the user device and/or may generate metadata related to the image that the user device captured. For example, the user device may gather the data and/or may generate the metadata after capturing the image of the document and/or the transaction card.

In some implementations, the data related to the user device and/or to the user of the user device may include location information that identifies a location of the user device (e.g., as gathered from a global positioning system (GPS) component of the user device), a set of credentials of the user device and/or of an account associated with the user device (e.g., a username/password combination, an access code, biometric information, and/or the like), a unique identifier associated with the user device (e.g., a telephone number, a mobile equipment identifier (MEID), an international mobile subscriber identity (IMSI), a serial number, a media access control (MAC) address, and/or the like), application information related to an application that was used to capture the image (e.g., an identifier of an instance of the application, an application version of the application, and/or the like), and/or the like. In some implementations, the metadata related to the image may include location information that identifies a location at which the image was captured, a timestamp for when the image was captured, an identifier for the user device, and/or the like.

As shown by reference number 106, the user device may provide, to the activation platform, the data, the image, and/or the metadata related to the image. For example, the user device may provide the data, the image, and/or the metadata to the activation platform based on a user of the user device opening a particular application on the user device and submitting the data, the image, and/or the metadata to the activation platform, based on the activation platform requesting the data, the metadata, and/or the image, after gathering the data and/or the metadata, after capturing the image, and/or the like. In some implementations, the user device may provide the data, the metadata, and/or the image to the activation platform in association with providing a request to the activation platform to activate the transaction card. In some implementations, the user device may provide the data, the metadata, and/or the image from an application installed on the user device (e.g., the application that was used to capture the image), in a text message, in an email, and/or the like.

Figure 1B:
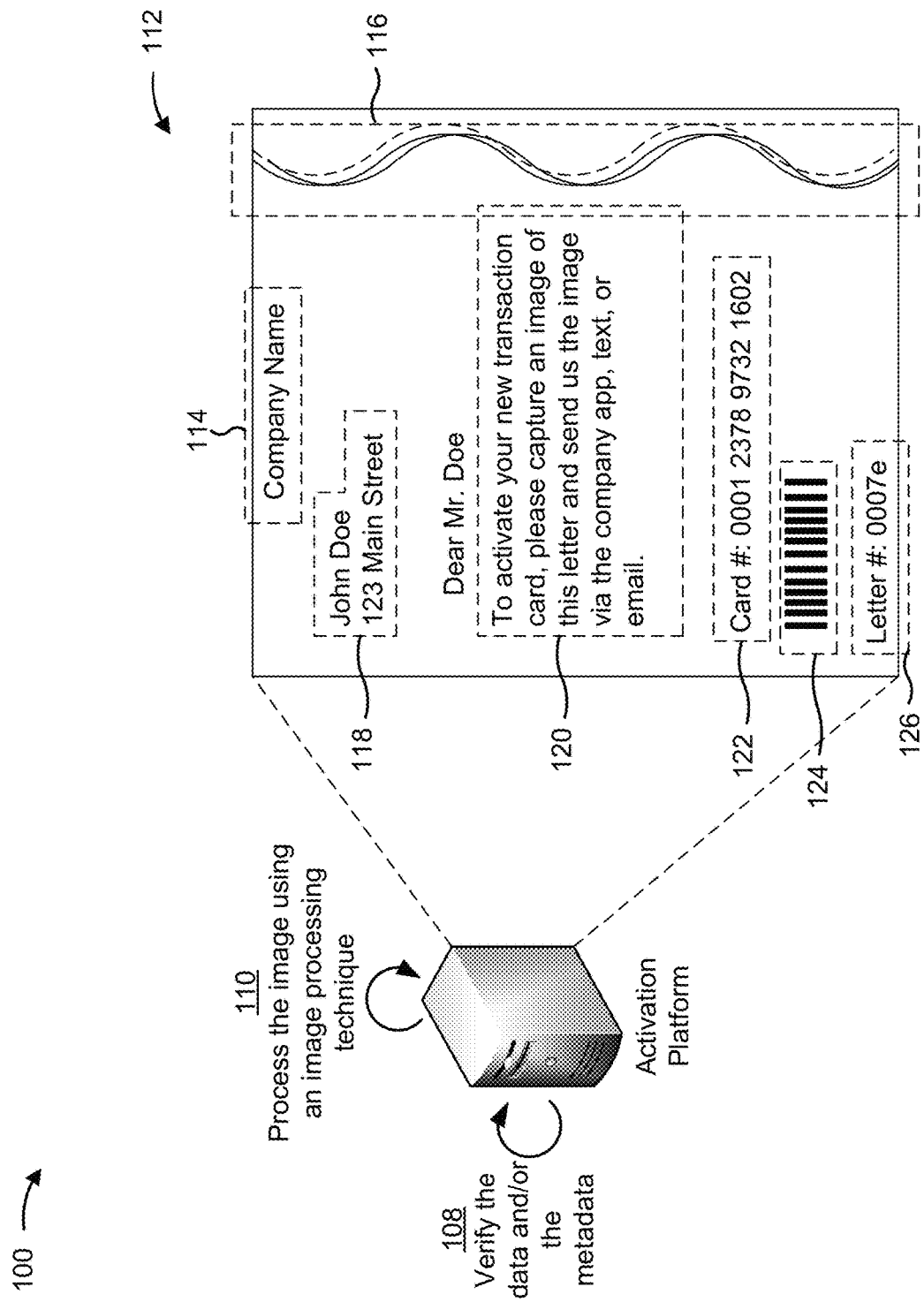

Turning to FIG. 1B, and as shown by reference number 108, the activation platform may verify the data and/or the metadata. For example, the activation platform may verify the data and/or the metadata after receiving the data and/or the metadata from the user device, based on receiving a request to verify the data and/or the metadata, based on receiving the request to activate the transaction card, and/or the like. In some implementations, the activation platform may verify the data and/or the metadata prior to activating the transaction card, such as to reduce or eliminate a fraudulent activation of the transaction card. For example, the activation platform may determine to not activate the transaction card and/or to not perform other operations described herein based on failing to verify the data and/or the metadata. This improves a security of the transaction card by preventing a fraudulent activation of the transaction card and conserves processing resources of the activation platform that would otherwise be consumed activating the transaction card for a fraudulent request.

In some implementations, the activation platform may verify the data to verify an identity of the user device and/or of a user of the user device. For example, the activation platform may verify the data to verify the identity after receiving the data, based on receiving a request to verify the identity, and/or the like. In some implementations, the activation platform may verify the data prior to performing other operations related to activating the transaction card, thereby conserving processing resources if the activation platform fails to verify the data. In some implementations, when verifying the data, the activation platform may perform a lookup of the data in a data structure and may verify the data based on a result of the lookup indicating a match. For example, the activation platform may determine whether a unique identifier associated with the user device matches an expected unique identifier of a user device associated with an account, whether location information associated with the user device matches an expected address associated with an account (e.g., within a threshold distance of the address), whether biometric information input by a user of the user device matches expected biometric information for an individual associated with an account, and/or the like.

In some implementations, the activation platform may verify the metadata to verify the image as a non-fraudulent image. For example, the activation platform may verify the metadata after receiving the metadata from the user device, based on receiving a request to verify the metadata, after verifying the data associated with the user device and/or the user of the user device, and/or the like.

In some implementations, when verifying the metadata, the activation platform may perform a comparison of timestamps associated with the image and with the document and may verify the metadata based on a result of the comparison. For example, the activation platform may perform a comparison of a first timestamp of the image and a second timestamp associated with the document (e.g., where the first timestamp is included in the metadata and the second timestamp is identified by performing a lookup of a verified identity of the user and/or the user device in a data structure) and may verify the metadata based on determining that the image was captured within a time period after the document was sent to a location associated with the cardholder of the transaction card. This improves a security of activating a transaction card using an image by preventing activation if the image was captured prior to when the document was sent to the cardholder (e.g., indicating that the image is a fraudulent image), or was captured after a time period after the document was sent to the cardholder (e.g., preventing use of an image of an old document that was obtained by a malicious actor), and/or the like.

In some implementations, when verifying the image, the activation platform may perform a comparison of location information associated with the image and the document and may verify the metadata based on a result of the comparison. For example, the activation platform may perform a comparison of first location information that identifies a first location at which the image was captured and second location information that identifies a second location to which the document was sent (e.g., where the first location information is included in the metadata and the second location information is identified by performing a lookup of a verified identity of the user and/or the user device in a data structure) and may verify the metadata based on a result of the comparison indicating a match between the first location and the second location within a threshold distance. This improves a security of activating the transaction card using an image by preventing activation of the transaction card when the image was captured at a location different from that to which the document was sent (e.g., such as when a malicious actor takes the document to a different location from the location to which the document was sent).

In some implementations, when verifying the metadata, the activation platform may perform a comparison of unique identifiers associated with the user device and/or the user and with the document (e.g., an individual and/or a user device associated with an account with which the document is associated) and may verify the metadata based on a result of the comparison. For example, the activation platform may perform a comparison of a first unique identifier that identifies the user device that captured the image and/or the user of the user device and a second unique identifier that identifies a user device and/or a user associated with an account with which the document is associated (e.g., where the first unique identifier is included in the metadata and the second unique identifier is identified by performing a lookup of a verified identity of the user device and/or the user in a data structure).

In this case, the activation platform may verify the metadata based on a result of the comparison indicating a match between the first unique identifier and the second unique identifier. This improves a security of activating the transaction card using an image by preventing activation of the transaction card when the image was captured by a user device and/or a user of the user device that is different from a user device and/or an individual associated with an account with which the document is associated (e.g., such as when a malicious actor attempts to activate the document at the location to which the document was sent).

As shown by reference number 110, the activation platform may process the image using an image processing technique. For example, the activation platform may process the image after verifying the data (e.g., after verifying the identity of the user device and/or the user of the user device), after verifying the metadata (e.g., after verifying the image of the document), and/or the like. In some implementations, the image processing technique may include a computer vision technique, a feature detection technique, an optical character recognition (OCR) technique, and/or the like.

In some implementations, the activation platform may use an image processing technique to identify a set of indicators included in the document. For example, the activation platform may use the image processing technique to identify a machine-readable label included in the document (e.g., that identifies the document, the transaction card, an account associated with the transaction card, and/or the like), a set of characters included in the document (e.g., a particular set of characters that form an identifier, that form particular text of the document, and/or the like), a graphical object included in the document, and/or the like.

In some implementations, the activation platform may process the image of the document to extract verification information from the image of the document (e.g., the verification information may include a subset of the indicators identified in the image). For example, verification information may be associated with verifying the document as an authentic document. Additionally, or alternatively, the activation platform may process the image of the document to extract activation information from the image of the document (e.g., the activation information may include a subset of the indicators identified in the image). For example, activation information may be associated with activating the transaction card.

In some implementations, and as described elsewhere herein, the image (or a different image) may show a portion of the transaction card. In this case, the activation platform may process the image (or the different image) using the image processing technique to extract information associated with the transaction card in a manner similar to that described with respect to the document.

In some implementations, when a single image shows a portion of the document and a portion of the transaction card, the activation platform may identify the portions of the image that include the document and the transaction card using the image processing technique prior to processing the image to identify indicators associated with the document and the transaction card. For example, the activation platform may use an edge detection technique to identify objects shown in the image (e.g., the document and the transaction card), and may identify the objects as the document and the transaction card based on the relative sizes of the objects detected (e.g., based on the relative pixel areas of the objects detected). Additionally, or alternatively, and as another example, the activation platform may detect different patterns of indicators associated with different objects shown in the image (e.g., different patterns that are associated with the document and with the transaction card), and may identify objects shown in the image as the document and as the transaction card based on the different patterns of indicators. Continuing with the previous example, the document may have a different layout of indicators than the transaction card, and the activation platform may identify the document and the transaction card based on the different layouts of the indicators. Additionally, or alternatively, when capturing the image, the user device may prompt the user of the user device to identify an area of the image that shows the document and/or an area of the image that shows the transaction card (e.g., by selecting a portion of the image for each of the document and the transaction card).

Reference number 112 shows an example document that the activation platform may process using the image processing technique. For example, the document may be an activation letter associated with activating the transaction card. In some implementations, the document may include various indicators (shown by reference numbers 114-126) that the activation platform may identify using the image processing technique. For example, and as shown by reference number 114, the activation platform may identify a name, a logo, and/or the like of an organization that sent the document. Additionally, or alternatively, and as shown by reference number 116 as another example, the activation platform may identify a graphical object, such as a background and/or margin graphic that includes various types of lines, various types of shapes, various colors, and/or the like, included in the document. Additionally, or alternatively, and as shown by reference number 118 as another example, the activation platform may identify an address block included in the document.

Additionally, or alternatively, and as shown by reference number 120 as another example, the activation platform may identify a body of the document (e.g., the body of the activation letter). Additionally, or alternatively, and as shown by reference number 122 as another example, the activation platform may identify a card number of the transaction card. Additionally, or alternatively, and as shown by reference number 124 as another example, the activation platform may identify a barcode (or another type of machine-readable label, such as a QR code) included in the document. Additionally, or alternatively, and as shown by reference number 126 as another example, the activation platform may identify an identifier that identifies the document (e.g., a letter number or serial number for an activation letter).

Figure 1C:
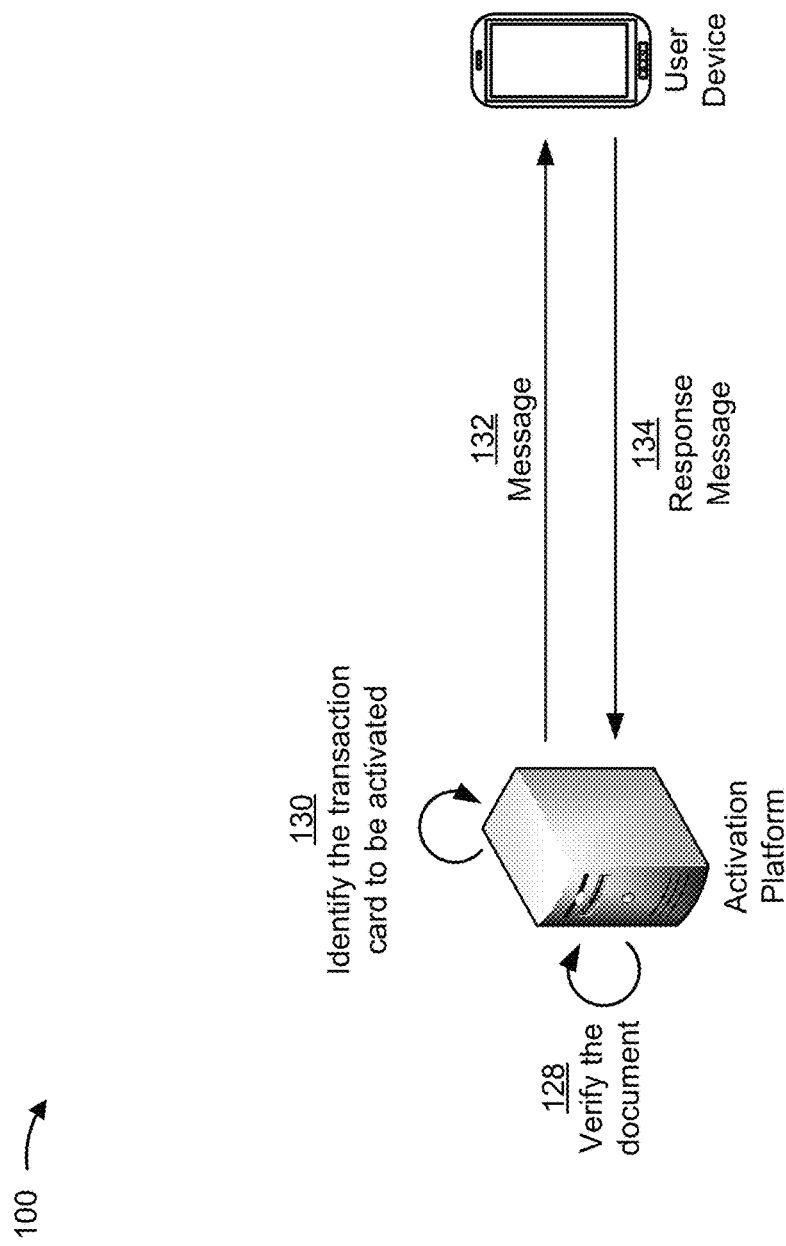

Turning to FIG. 1C, and as shown by reference number 128, the activation platform may verify the document as an authentic document. For example, the activation platform may verify the document as an authentic document (e.g., a non-fraudulent document, an expected document associated with a transaction card to be activated, and/or the like) after processing the image of the document to identify a set of indicators included in the document, based on a request to verify the document, and/or the like.

In some implementations, the activation platform may verify the document based on a set of indicators extracted from the image (e.g., a set of indicators included in the image of the document and/or the transaction card). For example, the activation platform may verify the document based on a set of machine-readable labels, a set of characters, a set of graphical objects, and/or the like extracted from the image using the image processing technique. Continuing with the previous example, the activation platform may verify the document based on a degree to which the indicators extracted from the image match an expected set of indicators.

In some implementations, the activation platform may determine whether each of the set of indicators, or the combination of indicators, matches an expected set, or combination, of indicators based on the location to which the document was sent (e.g., different indicators may be used for documents sent to different geographic locations, particular indicators may be expected to have different values based on the location to which the document was sent, and/or the like), a time at which the document was sent (e.g., different indicators may be used over time), a type of transaction card to be activated or a security level associated with the transaction card to be activated (e.g., documents associated with different types of transaction cards, or with transaction cards that have different security levels, may include different combinations of indicators and/or indicators with different values), and/or the like. Additionally, or alternatively, and continuing with the previous example, different combinations of indicators, or indicators with different values, may be used for different cardholders, such that each document-cardholder pair is associated with a unique combination of indicators and/or values of indicators, and the activation platform may determine whether the unique combination of indicators and/or values of the indicators match an expected combination of indicators and/or expected values based on the document associated with the transaction card to be activated.

In this way, the activation platform may verify a document in an image by determining whether a set of indicators included in the document matches an expected set of indicators for the document based on the cardholder associated with the transaction card to be activated, based on when the document was sent to the cardholder, based on the location to which the document was sent, and/or the like. This improves a security of activating a transaction card using information extracted from an image of a document via verification of a unique set of indicators extracted from the image.

In some implementations, the activation platform may determine a score associated with verifying the document, the identity, and/or the image. For example, the activation platform may determine a score that indicates a likelihood of an authenticity of the document, the identity, and/or the image. In some implementations, the activation platform may determine the score when the activation platform fails to verify the document, the identity, and/or the image with an accuracy that satisfies a threshold. For example, the activation platform may verify the document, the identity, and/or the image using various types of information for each, as described herein. Continuing with the previous example, some of the information that the activation platform uses to verify the document, the identity, and/or the image may not match expected information, or may not be present (e.g., in a received image, in metadata, and/or the like). In this case, the activation platform may determine the score to determine a likelihood of an authenticity of the document, the identity, and/or the image based on which information matched or failed to match expected information, and may verify the document, the identity, and/or the image based on whether the score satisfies a threshold, may perform an action based on whether the score satisfies a threshold, and/or the like, as described elsewhere herein.

In some implementations, the activation platform may use a machine learning model to determine the score. For example, the activation platform may process a result of verifying the document, the identity, and/or the image using a machine learning model (e.g., an extent to which the activation platform verified the document, the identity, and/or the image based on a match between information associated with the request to activate the transaction card and/or extracted from the image and expected information stored in a data structure), and the machine learning model may output a score associated with verifying the document, the identity, and/or the image.

In some implementations, the activation platform may generate a machine learning model via training of the machine learning model, may receive a trained machine learning model (e.g., that another device has trained), and/or the like. For example, the activation platform may train the machine learning model to output a score that indicates a likelihood of an authenticity of a document, an identity, and/or an image, as described herein.

In some implementations, the activation platform may train the machine learning model on a training set of data. For example, the training set of data may include data related to historical documents, historical identities, and/or historical images, and data that identifies an extent to which the historical documents, the historical identities, and/or the historical images are authentic, scores for the historical documents, the historical identities, and/or the historical images, and/or the like. Additionally, or alternatively, when the activation platform inputs the data related to the historical documents, the historical identities, and/or the historical images into the machine learning model, the activation platform may input a first portion of the data as a training set of data (e.g., to train a machine learning model), a second portion of the data as a validation set of data (e.g., to evaluate an effectiveness of the training of the machine learning model and/or to identify needed modifications to the training of the machine learning model), and a third portion of the data as a test set of data (e.g., to evaluate a finalized machine learning model after training and adjustments to the training using the first portion of the data and the second portion of the data). In some implementations, the activation platform may perform multiple iterations of training of the machine learning model, depending on an outcome of testing of the machine learning model (e.g., by submitting different portions of the data as the training set of data, the validation set of data, and the test set of data).

In some implementations, when training the machine learning model, the activation platform may utilize a random forest classifier technique to train the machine learning model. For example, the activation platform may utilize a random forest classifier technique to construct multiple decision trees during training and may output a classification of data. Additionally, or alternatively, when training the machine learning model, the activation platform may utilize one or more gradient boosting techniques to generate the machine learning model. For example, the activation platform may utilize an xgboost classifier technique, a gradient boosting tree, and/or the like to generate a prediction model from a set of weak prediction models.

In some implementations, when training the machine learning model, the activation platform may utilize logistic regression to train the machine learning model. For example, the activation platform may utilize a binary classification of the data related to the historical documents, the historical identities, and/or the historical images (e.g., whether the activation platform failed to verify information associated with the historical documents, the historical identities, and/or the historical images) to train the machine learning model. Additionally, or alternatively, when training the machine learning model, the activation platform may utilize a naïve Bayes classifier to train the machine learning model. For example, the activation platform may utilize binary recursive partitioning to divide the data related to the historical documents, the historical identities, and/or the historical images into various binary categories (e.g., starting with whether the historical documents, the historical identities, and/or the historical images match a historical pattern of data). Based on using recursive partitioning, the activation platform may reduce utilization of computing resources relative to manual, linear sorting and analysis of data points, thereby enabling use of thousands, millions, or billions of data points to train a machine learning model, which may result in a more accurate machine learning model than using fewer data points.

Additionally, or alternatively, when training the machine learning model, the activation platform may utilize a support vector machine (SVM) classifier. For example, the activation platform may utilize a linear model to implement non-linear class boundaries, such as via a max margin hyperplane. Additionally, or alternatively, when utilizing the SVM classifier, the activation platform may utilize a binary classifier to perform a multi-class classification. Use of an SVM classifier may reduce or eliminate overfitting, may increase a robustness of the machine learning model to noise, and/or the like.

In some implementations, the activation platform may train the machine learning model using a supervised training procedure that includes receiving input to the machine learning model from a subject matter expert. In some implementations, the activation platform may use one or more other model training techniques, such as a neural network technique, a latent semantic indexing technique, and/or the like. For example, the activation platform may perform a multi-layer artificial neural network processing technique (e.g., using a two-layer feedforward neural network architecture, a three-layer feedforward neural network architecture, and/or the like) to perform pattern recognition with regard to patterns of historical documents, historical identities, and/or historical images, patterns of degrees to which the historical documents, the historical identities, and/or the historical images were verified, and/or the like. In this case, use of the artificial neural network processing technique may improve an accuracy of a supervised learning model generated by the activation platform by being more robust to noisy, imprecise, or incomplete data, and by enabling the activation platform to detect patterns and/or trends undetectable to human analysts or systems using less complex techniques.

As an example, the activation platform may use a supervised multi-label classification technique to train the machine learning model. For example, as a first step, the activation platform may map data associated with the historical documents, the historical identities, and/or the historical images to a set of previously generated models after labeling the historical documents, the historical identities, and/or the historical images. In this case, the classification of historical documents, historical identities, and/or historical images may be characterized as having been accurately or inaccurately predicted, and/or the like (e.g., by a technician, thereby reducing processing relative to the activation platform being required to analyze each historical document, historical identity, and/or historical image).

As a second step, the activation platform may determine classifier chains, whereby labels of target variables may be correlated (e.g., in this example, labels may be a result of a historical classification and correlation may refer to historical classifications common to the different labels, and/or the like). In this case, the activation platform may use an output of a first label as an input for a second label (as well as one or more input features, which may be other data relating to the historical documents, the historical identities, and/or the historical images), and may determine a likelihood that a particular historical document, historical identity, and/or historical image is to be associated with at least one classification based on a similarity to other historical documents, historical identities, and/or historical images that are associated with similar data. In this way, the activation platform transforms classification from a multilabel-classification problem to multiple single-classification problems, thereby reducing processing utilization.

As a third step, the activation platform may determine a Hamming Loss Metric relating to an accuracy of a label in performing a classification by using the validation set of the data (e.g., an accuracy with which a weighting is applied to each historical document, historical identity, and/or historical image and whether each historical document, historical identity, and/or historical image is associated with a particular classification, results in a correct classification, and/or the like, thereby accounting for variations among historical documents, historical identities, and/or historical images).

As a fourth step, the activation platform may finalize the machine learning model based on labels that satisfy a threshold accuracy associated with the Hamming Loss Metric, and may use the machine learning model for subsequent determination of other models.

As another example, the activation platform may determine, using a linear regression technique, that a threshold percentage of values of data elements, in a set of values of data elements, do not indicate a particular or threshold likelihood of being authentic, and may determine that those values of data elements are to receive relatively low association scores. In contrast, the activation platform may determine that another threshold percentage of values of data elements indicates a particular or threshold likelihood do being authentic, and may assign a relatively high association score to those values of data elements. Based on the characteristics of the data elements indicating a likelihood of authenticity, or not, the activation platform may generate the model and may use the model for analyzing new data elements related to documents, identities, and/or images that the activation platform receives.

Accordingly, the activation platform may use artificial intelligence techniques, machine learning techniques, deep learning techniques, and/or the like to determine a likelihood of an authenticity of a document, an identity, and/or an image, as described herein.

In some implementations, the activation platform may generate a model and may use the model to perform various processing described herein. For example, based on data relating to hundreds, thousands, millions or more entities across multiple systems, the activation platform may determine a likelihood of an authenticity of a document, of an identity, and/or of an image. In this case, the model may be an item-based collaborative filtering model, a single value decomposition model, a hybrid recommendation model, and/or another type of model that enables various determinations described herein based on data, metadata, indicators, and/or the like.

In some implementations, the activation platform may generate different machine learning models associated with generating different predictions, associated with processing data from different systems and/or of different forms, and/or the like. In some implementations, the activation platform may input data received from a system into a machine learning model, and the machine learning model may output information that identifies a likelihood of an authenticity of a document, an identity, and/or an image, that identifies whether a document, an identity, and/or an image is verified, and/or the like. In some implementations, the activation platform may use this information to verify a document, an identity, and/or an image, as described elsewhere herein.

In some implementations, the activation platform may perform an action based on the score output by the machine learning model. For example, the activation platform may perform an action based on whether the score satisfies a threshold. In some implementations, and as shown by reference number 130, the activation platform may identify a transaction card to be activated. For example, the activation platform may identify a transaction card to be activated based on activation information extracted from the image (e.g., a card number of a transaction card, a name of a cardholder of the transaction card, an identifier of the document that can be used to identify a corresponding transaction card, and/or the like). Continuing with the previous example, the activation platform may perform a lookup of the activation information in a data structure to identify the transaction card.

Additionally, or alternatively, and as shown by reference number 132, the activation platform may send a message based on whether the score satisfies a threshold (e.g., a message to request confirmation of activation of the transaction card, to indicate that the score failed to satisfy the threshold, and/or the like). For example, when the score fails to satisfy a threshold (e.g., indicating a low likelihood that a document, an identity, and/or an image is authentic), the activation platform may send a message to the user device from which the request to activate the transaction card was received (e.g., when the user device matches an expected user device associated with an account associated with the transaction card), to an account (e.g., an email account, a messaging account, an online account, and/or the like) when the user device from which the request to activate the transaction card was received fails to match an expected user device based on the transaction card to be activated, and/or the like.

In some implementations, the message may include an input user interface element (e.g., a button, a text box, and/or the like) for an individual to confirm or deny activation of the transaction card, may activate an input component of the user device (e.g., for input of information to confirm or deny activation of the transaction card), and/or the like. In some implementations, and as shown by reference number 134, the user device may send a response message to the activation platform. For example, the response message may indicate whether the activation of the transaction card has been confirmed or denied.

Additionally, or alternatively, when the score fails to satisfy a threshold, the activation platform may provide a user of the user device with an opportunity to capture another image and/or to re-input information. For example, the activation platform may send a set of instructions to an application installed on the user device to cause the application provide a user interface for display where a user of the user device can capture an image, can input information, and/or the like. In some cases, the set of instructions may cause an input component, such as a camera, a fingerprint reader, and/or the like of the user device to be activated.

In some implementations, the activation platform may perform different operations, or need different information, related to verifying an identity, an image, a document, and/or the like for different requests to activate a transaction card. For example, the activation platform may verify an identity using a combination of a set of credentials and a location from which the request was sent, rather than just the set of credentials, during times of increased attempts for fraudulent activation, when a document was sent to a location associated with increased fraudulent activation attempts, when there has been fraudulent activity (e.g., a fraudulent activation attempt, a fraudulent purchase, and/or the like) associated with an account for which a transaction card is being activated, and/or the like. Additionally, or alternatively, and as another example, the activation platform may verify an identity, an image, and a document for a particular security level, and may only verify the identity and the document for another security level. In this way, the activation platform dynamically modifies operations performed, or the information needed, to activate a transaction card based on various factors and/or tailors security processing for transaction card activation based on the various factors. This dynamic modification conserves processing resources of the activation platform by reducing processing by the activation platform while maintaining a security of activating the transaction card.

Figure 1D:
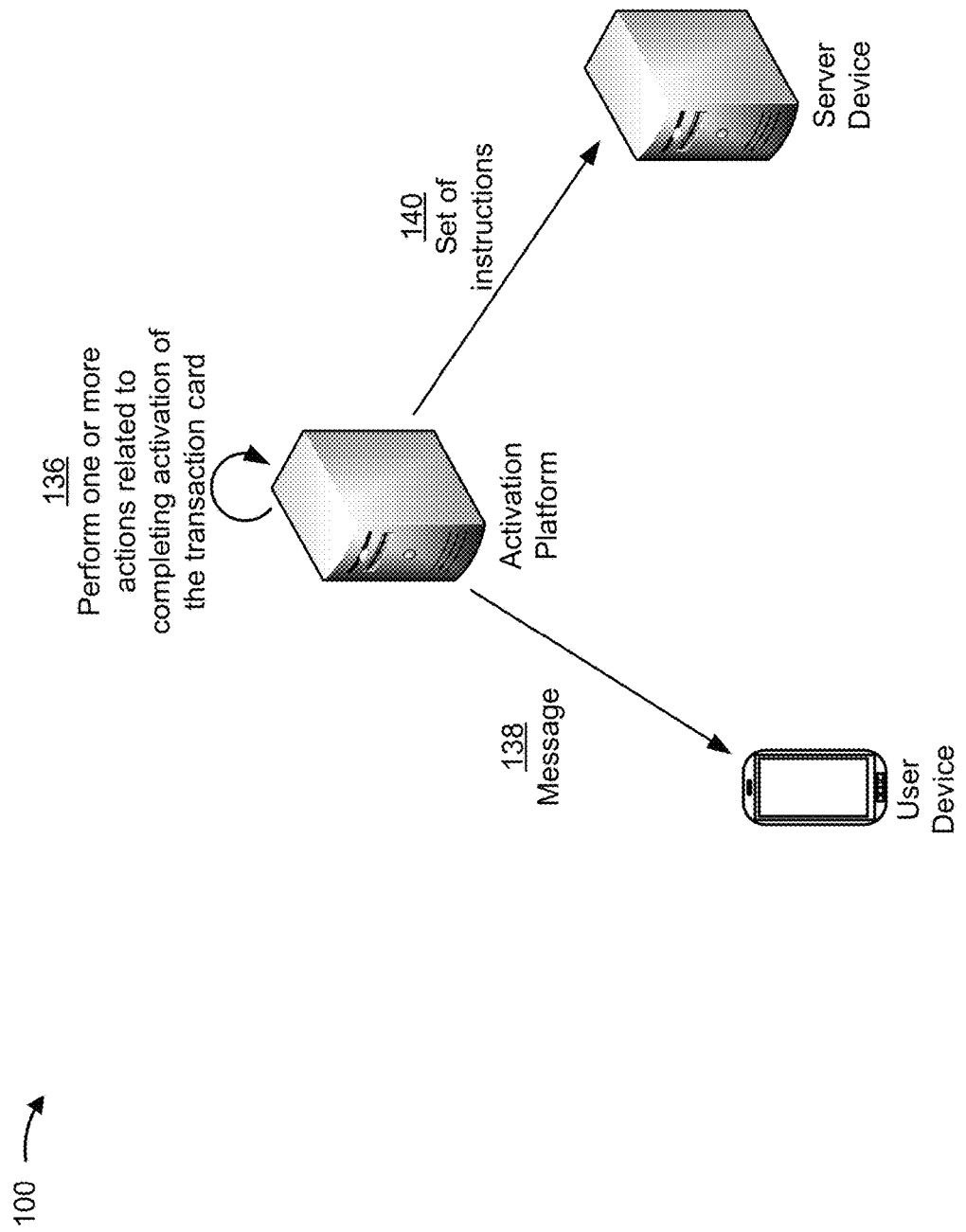

Turning to FIG. 1D, and as shown by reference number 136, the activation platform may perform one or more actions related to completing activation of the transaction card. For example, the activation platform may perform one or more actions related to completing activation of the transaction card after identifying the transaction card to be activated, after receiving a response message confirming activation of the transaction card, and/or the like. In some implementations, if the response message fails to confirm the activation (or the activation platform fails to receive the response message in a time period after sending the message to the user device), the activation platform may deny activation of the transaction card, may send another message to the user device and/or an account, and/or the like. Additionally, or alternatively, if activation of the transaction card fails, the activation platform may lock an account associated with the transaction card (e.g., by configuring a setting associated with the account, by communicating with a server device that hosts the account, and/or the like), may send a message to a device associated with a law enforcement agency regarding the failed activation, may update a database with information that identifies a time, a location, and/or the like for the failed activation so that the activation platform can identify potential risk factors for fraudulent activation and account for those risk factors when using a machine learning model to generate a score (e.g., the activation platform may generate a lower score for an activation attempt originating in an area with increased fraudulent activation attempts relative to other areas), when determining whether to request particular information to activate a transaction card (e.g., the activation platform may request additional information and/or perform additional operations related to activating the transaction card based on particular risk factors being present), and/or the like.

In some implementations, and as shown by reference number 138, the activation platform may send a message to the user device to indicate that the transaction card was activated. In some cases, the activation platform may send a similar message to an account associated with a cardholder. Additionally, or alternatively, and as shown by reference number 140, the activation platform may send a set of instructions to a server device (e.g., to complete activation of the transaction card). For example, the set of instructions may be associated with configuring stored information on the server device to indicate that the transaction card has been activated, has been denied activation, and/or the like.

Additionally, or alternatively, the activation platform may add a value to the transaction card (e.g., by sending a set of instructions to the server device). Additionally, or alternatively, the activation platform may update an account with information that identifies that the transaction card was activated by configuring a setting associated with the account and/or by sending a set of instructions to the server device. Additionally, or alternatively, the activation platform may receive a request to cancel the transaction card and may perform an action to cancel the transaction card, such as sending a set of instructions to the server device to configure information indicating that the transaction card was canceled, removing the transaction card from an account, transferring a value from the transaction card to an account and/or to another transaction card, and/or the like.

In this way, the activation platform provides a tool that can be used to accurately and securely activate a transaction card by verifying one or more indicators extracted from an image of a document and/or a transaction card. This improves an activation of a transaction card relative to other activation methods by improving an accuracy of verifying an identity of an individual attempting to activate the transaction card. In addition, utilizing the activation platform to activate a transaction card conserves computing resources that would otherwise be wasted due to a fraudulent activation of a transaction card by reducing or eliminating a risk of a fraudulent activation. Further, utilizing the activation platform to activate a transaction card conserves computing resources that would otherwise be consumed investigating a fraudulent activation of a transaction card by reducing or eliminating a risk of a fraudulent activation. Further, utilizing the activation platform to activate a transaction card conserves other resources (e.g., fuel resources, transaction card material resources, paper resources, and/or the like) that would otherwise be consumed as a result of a fraudulent activation of a transaction card by reducing or eliminating a risk of a fraudulent activation.

As indicated above, FIGS. 1A-1D are provided merely as an example. Other examples may differ from what was described with regard to FIGS. 1A-1D.

Figure 2:
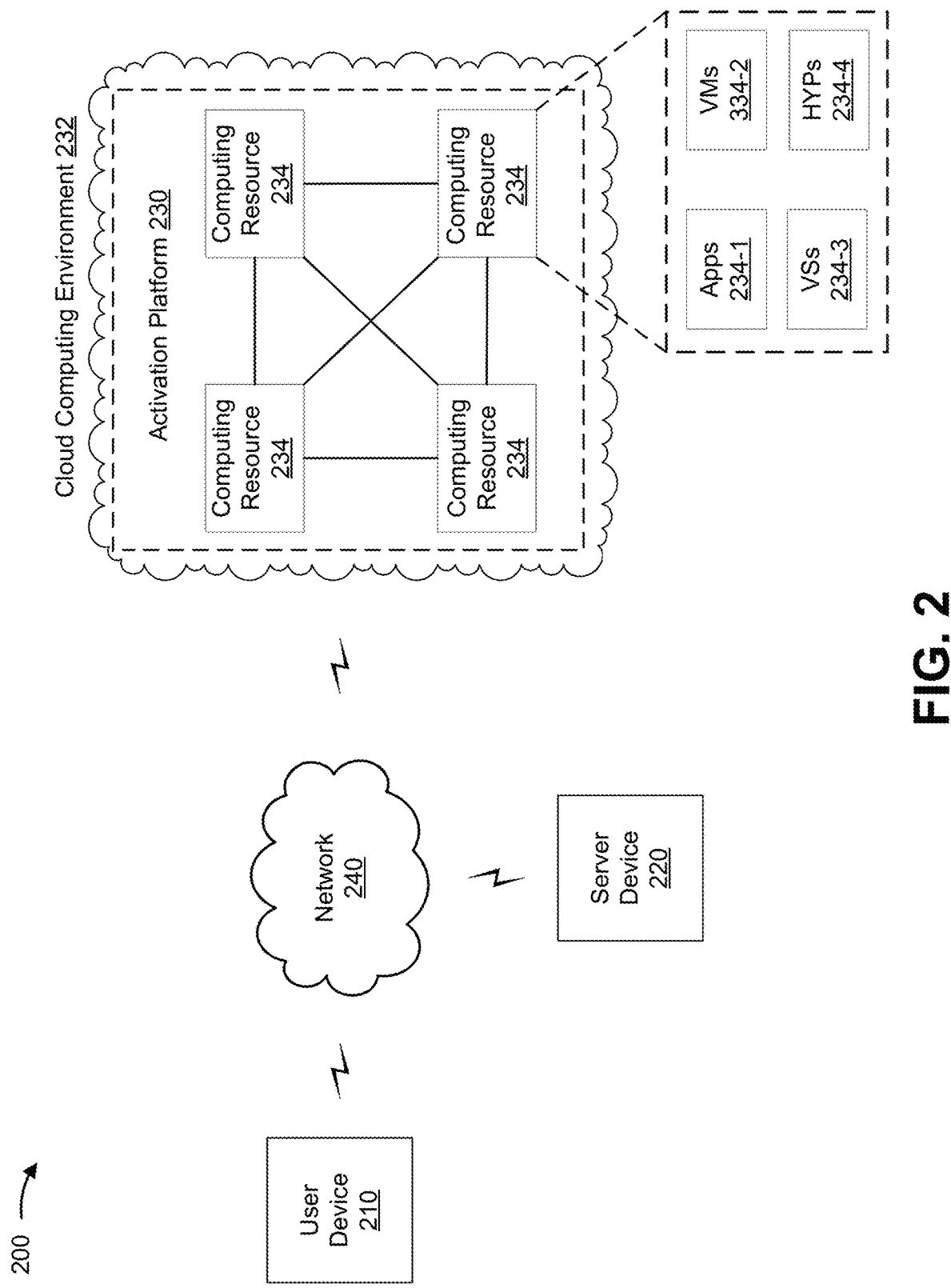
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a server device 220, an activation platform 230 hosted within a cloud computing environment 232 that includes a set of computing resources 234, and a network 240. Devices of environment 200 may interconnect via wired connections, wireless connections, or a combination of wired and wireless connections.

User device 210 includes one or more devices capable of receiving, generating, storing, processing, and/or providing data described herein. For example, user device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, and/or the like), a desktop computer, a set-top box, or a similar type of device. In some implementations, user device 210 may provide, to activation platform 230, a request for activation of a transaction card, as described elsewhere herein.

Server device 220 includes one or more devices capable of receiving, generating storing, processing, and/or providing data described herein. For example, server device 220 may include a server (e.g., in a data center or a cloud computing environment), a data center (e.g., a multi-server micro datacenter), a workstation computer, a virtual machine (VM) provided in a cloud computing environment, or a similar type of device. In some implementations, server device 220 may include a communication interface that allows server device 220 to receive information from and/or transmit information to other devices in environment 200. In some implementations, server device 220 may be a physical device implemented within a housing, such as a chassis. In some implementations, server device 220 may be a virtual device implemented by one or more computer devices of a cloud computing environment or a data center. In some implementations, server device 220 may receive, from activation platform 230, a set of instructions in association with activating a transaction card, as described elsewhere herein.

Activation platform 230 includes one or more devices capable of receiving, generating, storing, processing, and/or providing data described herein. For example, activation platform 230 may include a cloud server or a group of cloud servers. In some implementations, activation platform 230 may be designed to be modular such that certain software components can be swapped in or out depending on a particular need. As such, activation platform 230 may be easily and/or quickly reconfigured for different uses.

In some implementations, as shown in FIG. 2, activation platform 230 may be hosted in cloud computing environment 232. Notably, while implementations described herein describe activation platform 230 as being hosted in cloud computing environment 232, in some implementations, activation platform 230 may be non-cloud-based (i.e., may be implemented outside of a cloud computing environment) or may be partially cloud-based.

Cloud computing environment 232 includes an environment that hosts activation platform 230. Cloud computing environment 232 may provide computation, software, data access, storage, and/or other services that do not require end-user knowledge of a physical location and configuration of a system and/or a device that hosts activation platform 230. As shown, cloud computing environment 232 may include a group of computing resources 234 (referred to collectively as "computing resources 234" and individually as "computing resource 234").

Computing resource 234 includes one or more personal computers, workstation computers, server devices, or another type of computation and/or communication device. In some implementations, computing resource 234 may host activation platform 230. The cloud resources may include compute instances executing in computing resource 234, storage devices provided in computing resource 234, data transfer devices provided by computing resource 234, etc. In some implementations, computing resource 234 may communicate with other computing resources 234 via wired connections, wireless connections, or a combination of wired and wireless connections.

As further shown in FIG. 2, computing resource 234 may include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that may be provided to or accessed by one or more devices of environment 200. Application 234-1 may eliminate a need to install and execute the software applications on devices of environment 200. For example, application 234-1 may include software associated with activation platform 230 and/or any other software capable of being provided via cloud computing environment 232. In some implementations, one application 234-1 may send/receive information to/from one or more other applications 234-1, via virtual machine 234-2. In some implementations, application 234-1 may include a software application associated with one or more databases and/or operating systems. For example, application 234-1 may include an enterprise application, a functional application, an analytics application, and/or the like.

Virtual machine 234-2 includes a software implementation of a machine (e.g., a computer) that executes programs like a physical machine. Virtual machine 234-2 may be either a system virtual machine or a process virtual machine, depending upon use and degree of correspondence to any real machine by virtual machine 234-2. A system virtual machine may provide a complete system platform that supports execution of a complete operating system ("OS"). A process virtual machine may execute a single program, and may support a single process. In some implementations, virtual machine 234-2 may execute on behalf of a user (e.g., a user of user device 210), and may manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored.

This may enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 may present a virtual operating platform to the guest operating systems, and may manage the execution of the guest operating systems. Multiple instances of a variety of operating systems may share virtualized hardware resources.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
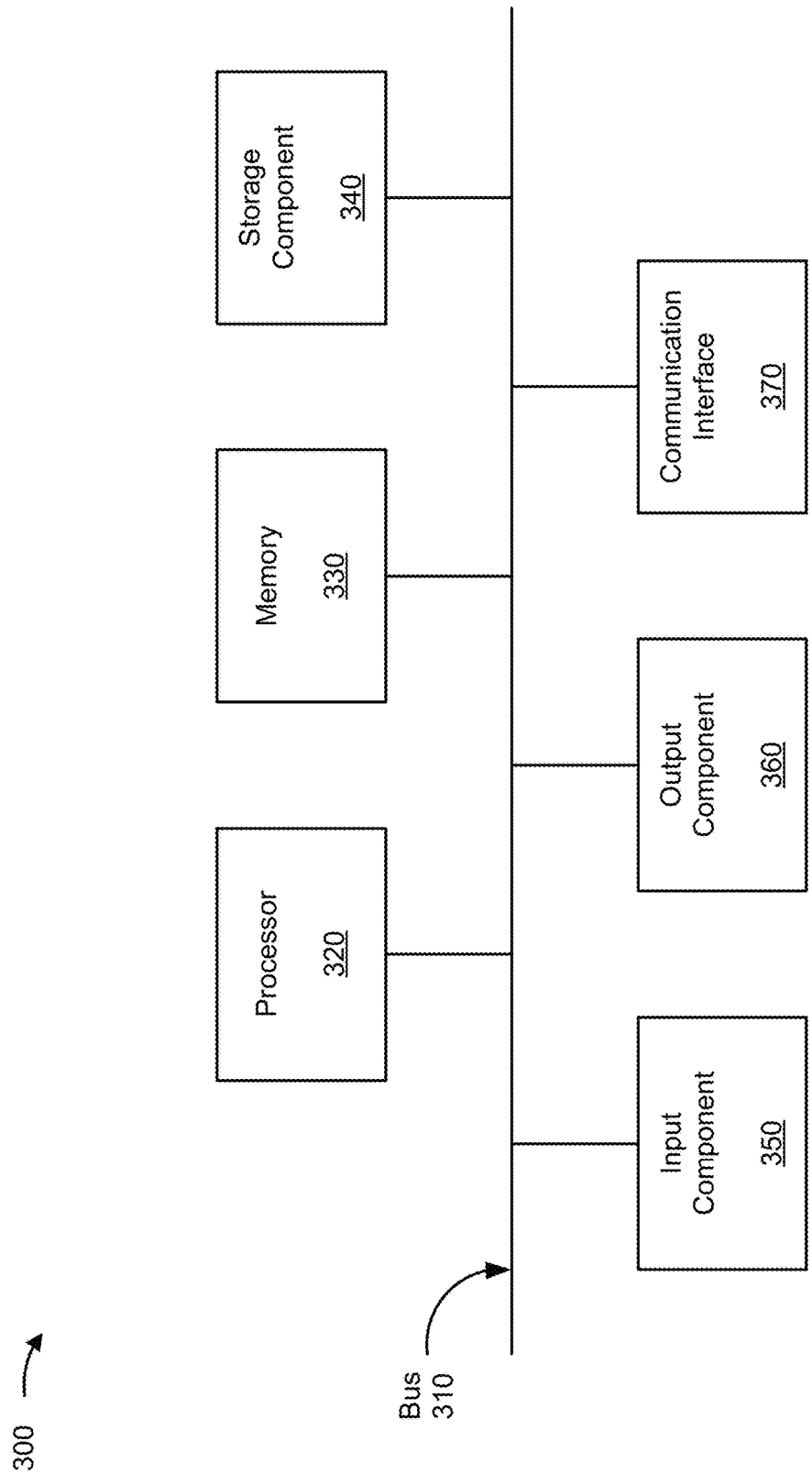
FIG. 3 is a diagram of example components of one or more devices of FIG. 2.

FIG. 3 is a diagram of example components of a device 300. Device 300 may correspond to user device 210, server device 220, activation platform 230, and/or computing resource 234. In some implementations, user device 210, server device 220, activation platform 230, and/or computing resource 234 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for activating a transaction card. In some implementations, one or more process blocks of FIG. 4 may be performed by an activation platform (e.g., activation platform 230). In some implementations, one or more process blocks of FIG. 4 may be performed by another device or a group of devices separate from or including the activation platform, such as a user device (e.g., user device 210), a server device (e.g., server device 220), a computing resource (e.g., computing resource 234), and/or the like.

As shown in FIG. 4, process 400 may include receiving, from a user device, a request to activate a transaction card, wherein the request includes an image of a document associated with activating the transaction card and a portion of the transaction card, metadata associated with the image, and data associated with the user device (block 410). For example, the activation platform (e.g., using computing resource 234, processor 320, input component 350, communication interface 370, and/or the like) may receive, from a user device, a request to activate a transaction card, as described above. In some implementations, the request includes an image of a document associated with activating the transaction card and a portion of the transaction card, metadata associated with the image, and data associated with the user device.

As further shown in FIG. 4, process 400 may include verifying, after receiving the request, the image as a non-fraudulent image based on the metadata associated with the image and a verified identity of the user device or a user of the user device (block 420). For example, the activation platform (e.g., using computing resource 234, processor 320, memory 330, storage component 340, and/or the like) may verify, after receiving the request, the image as a non-fraudulent image based on the metadata associated with the image and a verified identity of the user device or a user of the user device, as described above.

As further shown in FIG. 4, process 400 may include processing, after verifying the image as the non-fraudulent image, the image of the document and the portion of the transaction card using an image processing technique to extract information from the image of the document and the portion of the transaction card (block 430). For example, the activation platform (e.g., using computing resource 234, processor 320, and/or the like) may process, after verifying the image as the non-fraudulent image, the image of the document and the portion of the transaction card using an image processing technique to extract information from the image of the document and the portion of the transaction card, as described above.

As further shown in FIG. 4, process 400 may include identifying, based on the extracted information, the transaction card to be activated by performing a lookup of the extracted information in a data structure (block 440). For example, the activation platform (e.g., using computing resource 234, processor 320, and/or the like) may identify, based on the extracted information, the transaction card to be activated by performing a lookup of the extracted information in a data structure, as described above.

As further shown in FIG. 4, process 400 may include performing one or more actions related to completing an activation of the transaction card (block 450). For example, the activation platform (e.g., using computing resource 234, processor 320, memory 330, storage component 340, input component 350, output component 360, communication interface 370, and/or the like) may perform one or more actions related to completing an activation of the transaction card, as described above.

Process 400 may include additional implementations, such as any single implementation or any combination of implementations described below and/or in connection with one or more other processes described elsewhere herein.

In some implementations, the activation platform may receive the request from an application installed on the user device, in a text message from the user device, or in an email from an account associated with the user device or the user of the user device. In some implementations, the activation platform may perform, after receiving the request, another lookup of the data in another data structure, wherein the data includes at least one of: a unique identifier associated with the user device or the user of the user device, location information that identifies a location of the user device or the user of the user device, or biometric information associated with the user that was input via the user device, and may verify the identity of the user device or the user of the user device based on a result of the other lookup indicating a match.

In some implementations, the activation platform may perform a comparison of a first timestamp of the image and a second timestamp associated with the transaction card or the document, wherein the first timestamp is included in the metadata, wherein the second timestamp is identified based on using the verified identity of the user device or the user of the user device to perform another lookup of the second timestamp, may determine, after performing the comparison, that a result of the comparison indicates that the image was captured after the transaction card or the document was sent to a particular location, and may verify the image based on the result of the comparison indicating that the image was captured within a time period after the transaction card or the document was sent to the particular location.

In some implementations, the activation platform may perform a comparison of first location information that identifies a first location at which the image was captured and second location information that identifies a second location to which the transaction card or the document was sent, wherein the first location information is included in the metadata, wherein the second location information is identified based on using the verified identity of the user device or the user of the user device to perform another lookup of the second location information, may determine, after performing the comparison, that a result of the comparison indicates a match between the first location information and the second location information, and may verify the image based on the result of the comparison indicating the match between the first location information and the second location information.

In some implementations, the activation platform may perform a comparison of a first unique identifier that identifies the user device that captured the image and a second unique identifier associated with the transaction card or the document, wherein the first unique identifier is included in the metadata, wherein the second unique identifier is identified based on using the verified identity of the user device or the user of the user device to perform another lookup of the second unique identifier, may determine, after performing the comparison, that a result of the comparison indicates a match between the first unique identifier and the second unique identifier, and may verify the image based on the result of the comparison indicating the match between the first unique identifier and the second unique identifier.

In some implementations, the activation platform may process the image to extract verification information or activation information, may verify the transaction card or the document as authentic based on the verification information, and may identify, after verifying the transaction card or the document as authentic, the transaction card to be activated by performing another lookup of the activation information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for activating a transaction card. In some implementations, one or more process blocks of FIG. 5 may be performed by an activation platform (e.g., activation platform 230). In some implementations, one or more process blocks of FIG. 5 may be performed by another device or a group of devices separate from or including the activation platform, such as a user device (e.g., user device 210), a server device (e.g., server device 220), a computing resource (e.g., computing resource 234), and/or the like.

As shown in FIG. 5, process 500 may include receiving, from a user device, a request to activate a transaction card, wherein the request includes: an image of a document associated with activating the transaction card, metadata associated with the image, and data associated with the user device (block 510). For example, the activation platform (e.g., using computing resource 234, processor 320, input component 350, communication interface 370, and/or the like) may receive, from a user device, a request to activate a transaction card, as described above. In some implementations, the request includes: an image of a document associated with activating the transaction card, metadata associated with the image, and data associated with the user device.

As further shown in FIG. 5, process 500 may include processing, after receiving the request, the image to extract information from the image of the document, wherein the information includes verification information associated with verifying the document as an authentic document, or activation information associated with activating the transaction card (block 520). For example, the activation platform (e.g., using computing resource 234, processor 320, and/or the like) may process, after receiving the request, the image to extract information from the image of the document, as described above. In some implementations, the information includes: verification information associated with verifying the document as an authentic document, or activation information associated with activating the transaction card.

As further shown in FIG. 5, process 500 may include verifying, based on the extracted information, that the document in the image is the authentic document (block 530). For example, the activation platform (e.g., using computing resource 234, processor 320, and/or the like) may verify, based on the extracted information, that the document in the image is the authentic document, as described above.

As further shown in FIG. 5, process 500 may include performing, after verifying that the document is the authentic document, one or more actions related to completing an activation of the transaction card associated with the document (block 540). For example, the activation platform (e.g., using computing resource 234, processor 320, memory 330, storage component 340, input component 350, output component 360, communication interface 370, and/or the like) may perform, after verifying that the document is the authentic document, one or more actions related to completing an activation of the transaction card associated with the document, as described above.

Process 500 may include additional implementations, such as any single implementation or any combination of implementations described below and/or in connection with one or more other processes described elsewhere herein.

In some implementations, the activation platform may send a message to the user device or to an account associated with the user device or a user of the user device after receiving the request, wherein, the message is associated with requesting confirmation of the activation of the transaction card, and may receive, after sending the message, a response message from the user device or from the account, wherein the response message is associated with confirming the activation of the transaction card. In some implementations, the image of the document includes a portion of the transaction card, and the activation platform may process the image to extract the information from the portion of the transaction card included in the image.

In some implementations, the activation platform may perform, after processing the image, a comparison of first location information that identifies a first location at which the image was captured and second location information that identifies a second location to which the document was sent, wherein the first location information is included in the metadata, wherein the second location information is identified based on using a verified identity of the user device or of a user of the user device to perform a lookup of the second location information, wherein the verified identity is based on the data included in the request, may determine, after performing the comparison, that a result of the comparison indicates a match between the first location information and the second location information, and may verify the image based on the result of the comparison indicating the match between the first location information and the second location information.

In some implementations, the activation platform may perform, after processing the image, a comparison of a first unique identifier that identifies the user device that captured the image and a second unique identifier associated the document, wherein the first unique identifier is included in the metadata, wherein the second unique identifier is identified based on using a verified identity of the user device or of a user of the user device to perform a lookup of the second unique identifier, may determine, after performing the comparison, that a result of the comparison indicates a match between the first unique identifier and the second unique identifier, and may verify the image based on the result of the comparison indicating the match between the first unique identifier and the second unique identifier.

In some implementations, the activation platform may send a set of instructions to a server device to complete the activation of the transaction card, wherein the set of instructions is associated with causing the server device to configure stored information to indicate that the transaction card is activated. In some implementations, the activation platform may determine, in association with verifying that the document is the authentic document, a score associated with verifying the identity, the image, or the document, wherein the score indicates a likelihood of an authenticity of the verified identity, the image, or the document, and may determine whether to send a message to the user device or to an account associated with the user device or a user of the user device based on whether the score satisfies a threshold.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for activating a transaction card. In some implementations, one or more process blocks of FIG. 6 may be performed by an activation platform (e.g., activation platform 230). In some implementations, one or more process blocks of FIG. 6 may be performed by another device or a group of devices separate from or including the activation platform, such as a user device (e.g., user device 210), a server device (e.g., server device 220), a computing resource (e.g., computing resource 234), and/or the like.

As shown in FIG. 6, process 600 may include receiving, from a user device, a request to activate a transaction card, wherein the request includes an image of a document associated with activating the transaction card, metadata associated with the image, and data associated with the user device (block 610). For example, the activation platform (e.g., using computing resource 234, processor 320, input component 350, communication interface 370, and/or the like) may receive, from a user device, a request to activate a transaction card, as described above. In some implementations, the request includes an image of a document associated with activating the transaction card, metadata associated with the image, and data associated with the user device.

As further shown in FIG. 6, process 600 may include processing, after receiving the request, the image of the document using an image processing technique to extract information from the image of the document, wherein the information is associated with verifying the document as an authentic document or with activating the transaction card (block 620). For example, the activation platform (e.g., using computing resource 234, processor 320, and/or the like) may process, after receiving the request, the image of the document using an image processing technique to extract information from the image of the document, as described above. In some implementations, the information is associated with verifying the document as an authentic document or with activating the transaction card.

As further shown in FIG. 6, process 600 may include verifying that the document shown in the image is the authentic document based on the extracted information (block 630). For example, the activation platform (e.g., using computing resource 234, processor 320, and/or the like) may verify that the document shown in the image is the authentic document based on the extracted information, as described above.

As further shown in FIG. 6, process 600 may include performing, after verifying that the document shown in the image is the authentic document, one or more actions related to completing an activation of the transaction card (block 640). For example, the activation platform (e.g., using computing resource 234, processor 320, memory 330, storage component 340, input component 350, output component 360, communication interface 370, and/or the like) may perform, after verifying that the document shown in the image is the authentic document, one or more actions related to completing an activation of the transaction card, as described above.

Process 600 may include additional implementations, such as any single implementation or any combination of implementations described below and/or in connection with one or more other processes described elsewhere herein.

In some implementations, the activation platform may perform, after receiving the request, a comparison of a first timestamp of the image and a second timestamp associated with the document, wherein the first timestamp is included in the metadata, wherein the second timestamp is identified based on using a verified identity of the user device or of a user of the user device to perform a lookup of the second timestamp, wherein the verified identity is determined from the data or the metadata, may determine, after performing the comparison, that a result of the comparison indicates that the image was captured after the document was sent to a particular location, and may verify the image based on the result of the comparison indicating that the image was captured within a time period after the document was sent to the particular location.

In some implementations, the activation platform may perform, after receiving the request, a comparison of first location information that identifies a first location at which the image was captured and second location information that identifies a second location to which the document was sent, wherein the first location information is included in the metadata, wherein the second location information is identified based on using a verified identity of the user device or a user of the user device to perform a lookup of the second location information, wherein the verified identity is based on the data or the metadata, may determine, after performing the comparison, that a result of the comparison indicates a match between the first location information and the second location information, and may verify the image based on the result of the comparison indicating the match between the first location information and the second location information.

In some implementations, the activation platform may verify that the document is the authentic document based on one or more indicators extracted from the image using the image processing technique. In some implementations, the image of the document may include a portion of the transaction card, and the activation platform may process the image to extract the information from the portion of the transaction card included in the image. In some implementations, the activation platform may determine, in association with verifying that the document is the authentic document, a score associated with verifying an identity of the user device, a user of the user device, or the document, wherein the score indicates a likelihood of an authenticity of the identity, the image, or the document, and may send a message to the user device based on the score satisfying a threshold, wherein the message is associated with confirming the activation of the transaction card.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by an activation platform and from a user device, a request to activate a transaction card,
      wherein the request includes:
         an image of a document associated with activating the transaction card and a portion of the transaction card,
         metadata associated with the image, and
         data associated with the user device;
   verifying, by the activation platform and after receiving the request, the image as a non-fraudulent image based on the metadata associated with the image and a verified identity of the user device or a user of the user device;
   processing, by the activation platform and after verifying the image as the non-fraudulent image, the image of the document and the portion of the transaction card using an image processing technique to extract information from the image of the document and the portion of the transaction card,
      wherein the image processing technique includes one or more of a computer vision technique, a feature detection technique, or an optical character recognition (OCR) technique;
   identifying, by the activation platform and based on the extracted information, the transaction card to be activated by performing a lookup of the extracted information in a data structure; and
   performing, by the activation platform, one or more actions related to completing an activation of the transaction card.

2. The method of claim 1, wherein receiving the request comprises:
   receiving the request from an application installed on the user device, in a text message from the user device, or in an email from an account associated with the user device or the user of the user device.

3. The method of claim 1, further comprising:
   performing, after receiving the request, another lookup of the data in another data structure,
      wherein the data includes at least one of:
         a unique identifier associated with the user device or the user of the user device,
         location information that identifies a location of the user device or the user of the user device, or
         biometric information associated with the user that was input via the user device; and
   verifying the identity of the user device or the user of the user device based on a result of the other lookup indicating a match.

4. The method of claim 1, further comprising:
   performing a comparison of a first timestamp of the image and a second timestamp associated with the transaction card or the document,
      wherein the first timestamp is included in the metadata,
      wherein the second timestamp is identified based on using the verified identity of the user device or the user of the user device to perform another lookup of the second timestamp;
   determining, after performing the comparison, that a result of the comparison indicates that the image was captured after the transaction card or the document was sent to a particular location; and
   wherein verifying the image comprises:
      verifying the image based on the result of the comparison indicating that the image was captured within a time period after the transaction card or the document was sent to the particular location.

5. The method of claim 1, further comprising:
   performing a comparison of first location information that identifies a first location at which the image was captured and second location information that identifies a second location to which the transaction card or the document was sent,
      wherein the first location information is included in the metadata,
      wherein the second location information is identified based on using the verified identity of the user device or the user of the user device to perform another lookup of the second location information;
   determining, after performing the comparison, that a result of the comparison indicates a match between the first location information and the second location information; and
   wherein verifying the image comprises:
      verifying the image based on the result of the comparison indicating the match between the first location information and the second location information.

6. The method of claim 1, further comprising:
   performing a comparison of a first unique identifier that identifies the user device that captured the image and a second unique identifier associated with the transaction card or the document,
      wherein the first unique identifier is included in the metadata,
      wherein the second unique identifier is identified based on using the verified identity of the user device or the user of the user device to perform another lookup of the second unique identifier;
   determining, after performing the comparison, that a result of the comparison indicates a match between the first unique identifier and the second unique identifier; and wherein verifying the image comprises:
verifying the image based on the result of the comparison indicating the match between the first unique identifier and the second unique identifier.

7. The method of claim 1, wherein processing the image to extract the information comprises:
processing the image to extract verification information or activation information,
wherein the verification information includes one or more indicators comprising:
one or more machine-readable labels,
one or more characters, or
one or more graphical objects,
wherein the activation information is associated with activating the transaction card;
verifying the transaction card and the document as authentic based on the verification information; and
wherein identifying the transaction card to be activated comprises:
identifying, after verifying the transaction card and the document as authentic, the transaction card to be activated by performing another lookup of the activation information.

8. A device, comprising:
one or more memories; and
one or more processors, communicatively coupled to the one or more memories, configured to:
receive, from a user device, a request to activate a transaction card,
wherein the request includes:
an image of a document associated with activating the transaction card,
metadata associated with the image, and
data associated with the user device;
process, after receiving the request and using an image processing technique, the image to extract information from the image of the document,
wherein the image processing technique includes one or more of a computer vision technique, a feature detection technique, or an optical character recognition (OCR) technique, and
wherein the information includes:
verification information associated with verifying the document as an authentic document, or
activation information associated with activating the transaction card;
verify, based on the extracted information, that the document in the image is the authentic document; and
perform, after verifying that the document is the authentic document, one or more actions related to completing an activation of the transaction card.

9. The device of claim 8, wherein the one or more processors are further configured to:
send a message to the user device or to an account associated with the user device or a user of the user device after receiving the request,
wherein the message is associated with requesting confirmation of the activation of the transaction card; and
receive, after sending the message, a response message from the user device or from the account,
wherein the response message is associated with confirming the activation of the transaction card.

10. The device of claim 8, wherein the image of the document includes a portion of the transaction card; and
wherein the one or more processors, when processing the image, are configured to:
process the image to extract the information from the portion of the transaction card included in the image.

11. The device of claim 8, wherein the one or more processors are further configured to:
perform, after processing the image, a comparison of first location information that identifies a first location at which the image was captured and second location information that identifies a second location to which the document was sent,
wherein the first location information is included in the metadata,
wherein the second location information is identified based on using a verified identity of the user device or of a user of the user device to perform a lookup of the second location information,
wherein the verified identity is based on the data included in the request;
determine, after performing the comparison, that a result of the comparison indicates a match between the first location information and the second location information; and
verify the image based on the result of the comparison indicating the match between the first location information and the second location information.

12. The device of claim 8, wherein the one or more processors are further configured to:
perform, after processing the image, a comparison of a first unique identifier that identifies the user device that captured the image and a second unique identifier associated the document,
wherein the first unique identifier is included in the metadata,
wherein the second unique identifier is identified based on using a verified identity of the user device or of a user of the user device to perform a lookup of the second unique identifier;
determine, after performing the comparison, that a result of the comparison indicates a match between the first unique identifier and the second unique identifier; and
verify the image based on the result of the comparison indicating the match between the first unique identifier and the second unique identifier.

13. The device of claim 8, wherein the one or more processors, when performing the one or more actions, are configured to:
send a set of instructions to a server device to complete the activation of the transaction card,
wherein the set of instructions is associated with causing the server device to configure stored information to indicate that the transaction card is activated.

14. The device of claim 8, wherein the one or more processors are further configured to:
determine, in association with verifying that the document is the authentic document, a score associated with verifying an identity, the image, or the document,
wherein the score indicates a likelihood of an authenticity of the verified identity, the image, or the document; and
determine whether to send a message to the user device or to an account associated with the user device or a user of the user device based on whether the score is greater or equal to a threshold.

15. A non-transitory computer-readable medium storing instructions, the instructions comprising:

one or more instructions that, when executed by one or more processors of an activation platform, cause the one or more processors to:
  receive, from a user device, a request to activate a transaction card,
    wherein the request includes:
      an image of a document associated with activating the transaction card,
      metadata associated with the image, and
      data associated with the user device;
  process, after receiving the request, the image of the document using an image processing technique to extract information from the image of the document,
    wherein the image processing technique includes one or more of a computer vision technique, a feature detection technique, or an optical character recognition (OCR) technique, and
    wherein the information is associated with verifying the document as an authentic document or with activating the transaction card;
  verify that the document shown in the image is the authentic document based on the extracted information; and
  perform, after verifying that the document shown in the image is the authentic document, one or more actions related to completing an activation of the transaction card.

16. The non-transitory computer-readable medium of claim 15, wherein the one or more instructions, when executed by the one or more processors, further cause the one or more processors to:
  perform, after receiving the request, a comparison of a first timestamp of the image and a second timestamp associated with the document,
    wherein the first timestamp is included in the metadata,
    wherein the second timestamp is identified based on using a verified identity of the user device or of a user of the user device to perform a lookup of the second timestamp,
      wherein the verified identity is determined from the data or the metadata;
  determine, after performing the comparison, that a result of the comparison indicates that the image was captured after the document was sent to a particular location; and
  verify the image based on the result of the comparison indicating that the image was captured within a time period after the document was sent to the particular location.

17. The non-transitory computer-readable medium of claim 15, wherein the one or more instructions, when executed by the one or more processors, further cause the one or more processors to:
  perform, after receiving the request, a comparison of first location information that identifies a first location at which the image was captured and second location information that identifies a second location to which the document was sent,
    wherein the first location information is included in the metadata,
    wherein the second location information is identified based on using a verified identity of the user device or a user of the user device to perform a lookup of the second location information,
      wherein the verified identity is based on the data or the metadata;
  determine, after performing the comparison, that a result of the comparison indicates a match between the first location information and the second location information; and
  verify the image based on the result of the comparison indicating the match between the first location information and the second location information.

18. The non-transitory computer-readable medium of claim 15, wherein the one or more instructions, that cause the one or more processors to verify that the document is the authentic document, cause the one or more processors to:
  verify that the document is the authentic document based on one or more indicators extracted from the image using the image processing technique.

19. The non-transitory computer-readable medium of claim 15, wherein the image of the document includes a portion of the transaction card; and
  wherein the one or more instructions, that cause the one or more processors to process the image, cause the one or more processors to:
    process the image to extract the information from the portion of the transaction card included in the image.

20. The non-transitory computer-readable medium of claim 15, wherein the one or more instructions, when executed by the one or more processors, further cause the one or more processors to:
  determine, in association with verifying that the document is the authentic document, a score associated with verifying an identity of the user device, a user of the user device, or the document,
    wherein the score indicates a likelihood of an authenticity of the identity, the image, or the document; and
  send a message to the user device based on the score satisfying a threshold,
    wherein the message is associated with confirming the activation of the transaction card.

* * * * *